Patented Aug. 17, 1926.

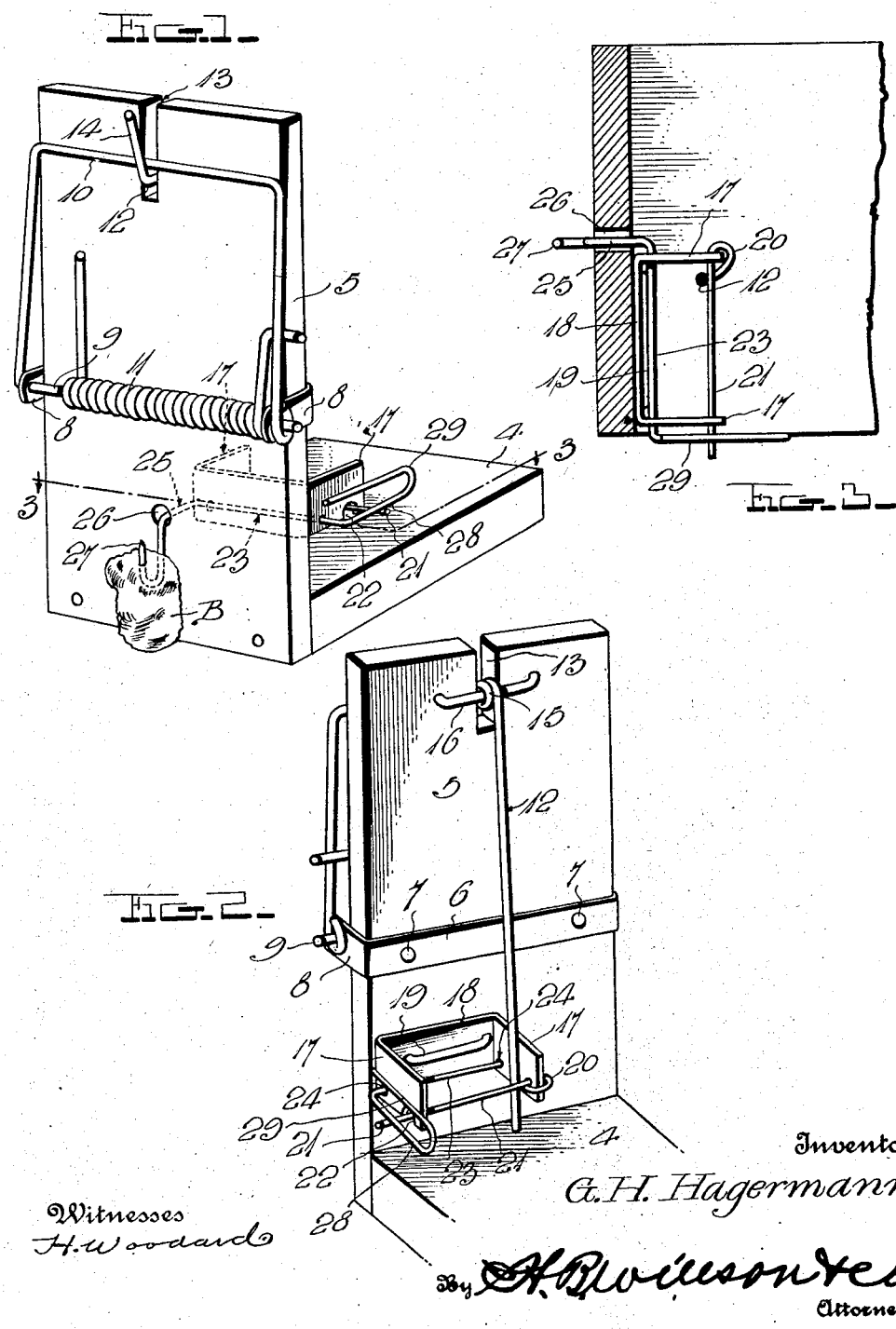

1,596,351

UNITED STATES PATENT OFFICE.

GEORGE H. HAGERMANN, OF MUSCATINE, IOWA.

TRAP.

Application filed December 3, 1925. Serial No. 72,984.

My invention relates to improvements in animal traps and the present illustration thereof is directed to one intended for catching rats, the principal object being to provide an exceptionally simple and inexpensive, yet a highly efficient construction in which provision is made for holding the bait near the floor or other surface by which the trap is supported, unique tripping means being provided, whereby movement of the bait will quickly and easily spring the trap.

With the foregoing in view, the invention resides in the novel subject matter hereinafter described and claimed, the description being supplemented by the accompanying drawing.

Figures 1 and 2 are perspective views looking in opposite directions.

Figure 3 is a horizontal sectional view as indicated by line 3—3 of Fig. 1.

The form of construction selected for illustration in the present application may be considered as preferred, with the understanding that within the scope of the invention as claimed, variations may be made.

The numeral 4 designates a base, preferably although not necessarily formed of wood. Secured to and rising from one end of said base, is a wall 5 which may also be formed of wood, it being understood that this wall and the base 4 can be constructed from metal, if desired. A metal strip 6 is secured by nails or the like 7 across the rear side of the wall 5, at the intermediate portion of the latter, the ends of this strip being bent forwardly at the edges of said wall, to provide a pair of arms 8 which project forwardly from said wall. These arms have openings through which a shaft 9 passes, said shaft carrying a U-shaped jaw 10. A spring 11 surrounds the shaft and is operatively engaged with the jaw 10 for forcing it downwardly to operative position, when the trap is sprung.

For holding the jaw 10 in raised or set position, I provide an L-shaped jaw-holding lever 12 having a long arm and a short arm, the former being disposed vertically at the back of the wall 5, while said short arm passes forwardly through a slot 13 in said wall and is formed with an upwardly bent front end 14 to engage the jaw 10. At the juncture of its two arms, the lever 12 is coiled to form a bearing 15 through which the central portion of a staple 16 passes, the ends of said staple being driven into the wall 5. Thus, the lever is inexpensively, yet effectively mounted.

Novel provision has been made for holding the lever 12 in jaw-holding position. Two arms 17 are secured to and project rearwardly from the lower portion of the wall 5, said arms being preferably formed by laterally bending the ends of a sheet metal strip 18, the intermediate portion of the latter being secured by a staple 19 or other preferred means, to the wall 5. Loosely pivoted at 20 to one of these arms, is a lever-holding arm 21, this arm being engageable with a shoulder 22 on the other arm 17, said shoulder being preferably formed by one wall of a notch in said last named arm. When the jaw 10 is set and the lever 12 is engaged with it, disposition of the pivoted arm 21 behind the lower end of said lever, and engagement of said arm 21 with the shoulder 22, will hold the trap in set position, and unique provision, described below, is made for releasing the arm 21 when the prey attempts to consume or remove the bait.

A rock shaft 23 passes through openings 24 in the arms 17 and at one end is formed with a forwardly extending arm 25 passing loosely through an opening 26 in the wall 5 and provided at its front end with a bait-holding hook 27. The other end of the shaft 23 is formed with a rearwardly projecting arm 28 adapted to overlie the pivoted arm 21. This arm 28 is preferably formed with a forwardly directed, overlying portion 29 so that it may readily be gripped when setting the trap. The shaft 23 and the arms at the ends thereof are preferably formed by bending a single piece of wire, in the manner shown.

To set the trap, the jaw 10 is swung upwardly to the position shown in Figs. 1 and 2 and the lever 12 is engaged with said jaw. The lower end of this lever is positioned between the arms 17 and the pivoted arm 21 is passed behind said lever 12 and engaged with the shoulder 22, the arm 28 being of course at this time swung upwardly so that it will overlie the pivoted arm 21. The trap is now in readiness for operation and as soon as the shaft 23 is rocked by an upward pull upon the bait, the arm 28 forces downwardly on the pivoted arm 21, disengaging the latter from the shoulder 22 and freeing the lever 12, so that the spring 11 may immediately snap the jaw 10 downwardly to operative position.

The invention is exceptionally simple and inexpensive, may be advantageously manufactured and marketed, yet will be highly efficient. Preferably, the bait B is of such size as to give the appearance that it is resting upon the floor instead of being suspended, as I have found by so doing, rats have less fear of being caught while attempting to eat the bait.

As above stated, the details disclosed are preferable, but I do not limit myself to an extent other than that to which I am limited by the invention as claimed.

I claim:—

1. A trap comprising a base, a wall rising therefrom and having an opening near its lower end, a spring-actuated jaw mounted at the front side of said wall and adapted to swing downwardly to operative position, a jaw-holding lever pivotally mounted at the rear side of said wall and having a portion for engagement with said jaw, a pair of arms projecting rearwardly from the lower portion of said wall and adapted to straddle the lower end of said lever, a pivoted arm loosely mounted on one of said pair of arms and adapted to engage the rear side of said lever to hold the latter in operative position, the other of said pair of arms being provided with a shoulder to be engaged by said pivoted arm to hold the latter in its effective position, a rock shaft supported by said pair of arms and having a bait-holding portion projecting forwardly from the aforesaid opening, and an arm projecting laterally from said rock shaft, said last-named arm engaging said pivoted arm to release the latter from the aforesaid shoulder when the bait is moved.

2. A trap comprising a base, a wall rising therefrom and having an opening near its lower portion, a spring-actuated jaw mounted at the front side of said wall and adapted to swing downwardly to operative position, a jaw-holding lever mounted at the rear side of the wall and having a portion to engage the jaw, a metal strip bent into U-shape and having its intermediate portion secured to the rear side of said wall, the end portions of said strip projecting rearwardly and constituting arms adapted to straddle the lower end of the aforesaid lever, a pivoted arm loosely connected with one of said pair of arms and adapted to engage the rear side of said lever, the other of said pair of arms having a shoulder to be engaged by said pivoted arm, a rock shaft supported by said pair of arms and having a bait-holding portion projecting forwardly through the aforesaid opening, and an arm projecting laterally from said rock shaft for disengaging said pivoted arm from said shoulder.

3. A trap comprising a base, a wall rising therefrom and having an opening near its lower end, a spring-actuated jaw pivoted at the front side of said wall and adapted to swing downwardly to operative position, a jaw-holding lever fulcrumed at the rear side of said wall and having a portion to engage the jaw, a pair of arms projecting rearwardly from the lower portion of said wall and adapted to straddle the lower end of said lever, a pivoted arm loosely connected with one of said pair of arms, the other of said pair of arms having a shoulder to be engaged by said pivoted arm, a wire rock shaft passing through openings in said pair of arms and having one of its ends bent laterally and extended through the opening of said wall to form a bait-holder, the other end of said wire rock shaft being laterally bent to form an additional arm adapted to engage said pivoted arm to force the latter from engagement with said shoulder.

In testimony whereof I have hereunto affixed my signature.

GEORGE H. HAGERMANN.